United States Patent [19]

Lenz

[11] Patent Number: 5,101,504
[45] Date of Patent: Mar. 31, 1992

[54] SHOULDER ACTIVATED HEADSET

[76] Inventor: Vernon C. Lenz, 3211 W. Warner Ave., Santa Ana, Calif. 92704

[21] Appl. No.: 365,542

[22] Filed: Jun. 13, 1989

[51] Int. Cl.$^5$ .................. H04B 1/44; H04B 1/38; H01H 35/00
[52] U.S. Cl. .................. 455/78; 455/90; 455/100; 200/52 R; 379/430
[58] Field of Search .......... 455/74, 78, 89–90, 455/93, 83, 100, 348, 350–351, 128; 379/430, 422, 427; 200/DIG. 2, 52 R; 128/782; 341/20–21, 27; 340/573, 686; 381/109–110, 123, 187

[56] References Cited

U.S. PATENT DOCUMENTS

| | | | |
|---|---|---|---|
| 2,541,042 | 2/1951 | Curtis | 455/78 |
| 3,218,607 | 11/1965 | Brock et al. | 128/201.19 |
| 3,229,059 | 1/1966 | Beatty | 200/61.41 |
| 3,586,798 | 6/1971 | Holmes | 200/52 R |
| 3,835,279 | 9/1974 | Andreas | 200/332 |
| 3,868,573 | 2/1975 | Holcomb et al. | 455/90 |
| 4,152,553 | 5/1979 | White | 379/430 |
| 4,325,143 | 4/1982 | Kerr | 455/89 |
| 4,420,657 | 12/1983 | Larkin | 379/430 |
| 4,484,029 | 11/1984 | Kenney | 379/61 |
| 4,634,816 | 1/1987 | O'Malley et al. | 379/430 |
| 4,754,484 | 6/1988 | Larkin et al. | 379/430 |

FOREIGN PATENT DOCUMENTS 0490362  1/1930  Fed. Rep. of Germany ...... 379/430

Primary Examiner—Reinhard J. Eisenzopf
Assistant Examiner—Andrew Faile
Attorney, Agent, or Firm—Arthur Freilich; Robert D. Hornbaker; Leon D. Rosen

[57] ABSTRACT

A headset assembly is described, of the type which includes a headband with earphones for delivering sound to the wearer, a microphone into which the wearer talks, and a "push-to-talk" switch that is operated when the wearer wishes to talk, whcih facilitates operation of the switch. The switch (24) has an actuator part (30) extending from one of the sides of the headset, such as the left side, to a location above the left shoulder of the wearer. The wearer activates the switch by lifting his left shoulder to press on the actuator part of the switch. The switch is preferably closed by depressing the actuator part, and extends in a downward-outward direction at an angle of about 30° from the vertical, so the natural lifting of the shoulder causes the shoulder to move along the direction of depression of the switch actuator part.

8 Claims, 1 Drawing Sheet

SHOULDER ACTIVATED HEADSET

BACKGROUND OF THE INVENTION

Firefighters, military personnel, truckdrivers, and other workers sometimes use headsets connected to two-way radios. The headsets include earphones at the wearer's ears and a microphone in front of his or her face, all of which are held by a resilient headband to the wearer's head. Normally, the wearer hears incoming messages at the earphones. When he wishes to talk, he operates a manually-operable switch that switches the radio from a receive mode to a transmit mode, and talks into a microphone. Commonly available headsets use a switch near one of the headphones, which is operated by the wearer raising his hand to the earphone, finding the push button, and depressing it. The need to use the wearer's hand to find the switch and depress it is undesirable in many applications, because it may require the wearer to take one hand off equipment and it may require some groping to find the switch.

The prior art has recognized the need for headset switches or the like that do not require operation by the hand of the wearer. U.S. Pat. No. 3,586,798 by Holmes describes a microphone with a push-to-talk switch that is operated by downward pivoting of the wearer's chin against a lever that depresses a push button lying on his chest. This arrangement requires a switch mechanism on the person's chest, which makes it unsuitable for a headset assembly that uses a simple band to hold the earphones and microphone to the wearer's head. U.S. Pat. No. 3,229,059 by Beatty shows a chin-operated switch, that may be used by a person who is otherwise paralyzed. This also has the disadvantage that it would make a simple headset assembly bulky. U.S. Pat. No. 2,541,042 by Curtis shows a transceiver with an underarm switch operated by squeezing the arm against the side of the body. This arrangement is also unsuitable for a compact headset assembly. A compact headset assembly with a push-to-talk type switch that could be operated without use of the arms, or even movement of the head, and yet which was of simple and economical construction and which could be operated in a simple manner while the headset was mounted on the wearer's head, would be of considerable value.

DESCRIPTION OF THE PREFERRED EMBODIMENT

In accordance with the present invention, a headset assembly is provided, of the type that includes at least one earphone and a microphone held by a headband and controlled by a "push-to-talk" type switch, which facilitates operation of the switch. The switch includes a switch actuator extending with a downward directional component from one side of the assembly to a location lying above one shoulder of the wearer. When the wearer lifts his shoulder it presses on the switch to operate it, to switch between receive and transmit modes. The switch actuator is preferably a depressible switch extending at about a 30° downward-and-outward angle from the outer side of an earphone, so it is easily depressed by lifting a shoulder.

The novel features of the invention are set forth with particularity in the appended claims. The invention will be best understood from the following description when read in conjunction with the accompanying drawings.

DESCRIPTION OF THE PREFERRED EMBODIMENT

Figure 1:
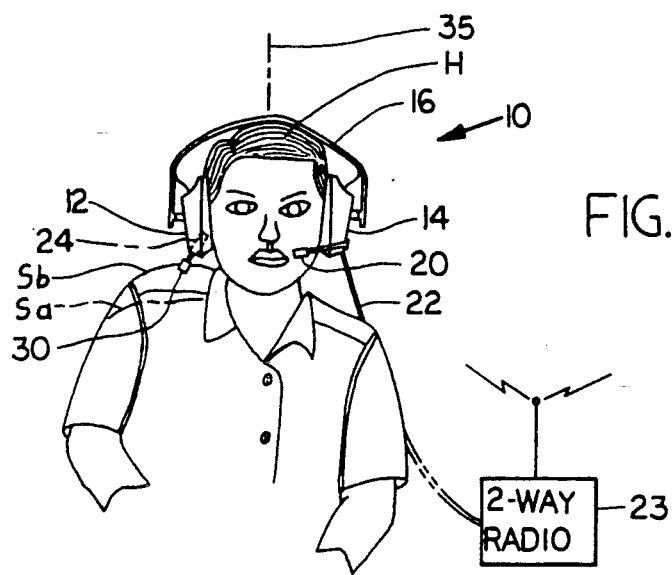
FIG. 1 is a front elevation mirror image view of a headset assembly constructed in accordance with the invention, shown on a wearer's head, and with the wearer having raised his shoulder to operate the headset switch.

FIG. 1 illustrates a headset assembly 10 of the present invention, which includes a pair of earphones 12, 14 lying at the opposites sides of the wearer's head H at his ears, and a headband 16 that mounts on the wearer's head and holds the earphones in place. The headset assembly also includes a microphone 20 that lies substantially in front of the speaker's face to pick up words spoken by him. A cord 22 extends from the assembly to a two-way radio 23 which may be mounted on the belt of the wearer, in the cab of a truck, or otherwise. Such two-way radios do not include a duplex and can only transmit, or only receive, at any given time. The radio usually is in a receive mode wherein it receives messages delivered to the earphones 12, 14. When the wearer wishes to transmit, he must activate a "push-to-talk" switch 24. Headset assemblies of this type can be easily mounted on the wearer by merely pulling apart the earphones 12, 14, placing them at the ears of the wearer, and allowing the elastic headband to then push the earphones against the opposite sides of the wearer where they hold themselves and the microphone in place. Prior headsets of this type used a "push-to-talk" switch that required the wearer to depress a switch with his fingers. The wearer had to have one hand free and to move that hand up to an earphone, find the switch, and depress it. This had the disadvantage that the switch could not be operated when the person's hand was occupied, and that it might take several seconds for the person to find the switch.

Figure 2:
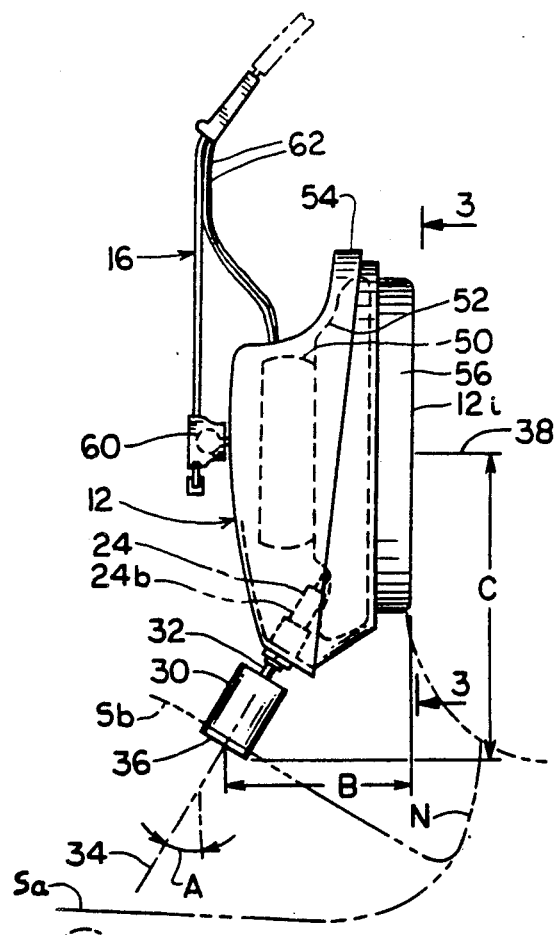
FIG. 2 is a rear elevation view of one side of the headset assembly of FIG. 1, with a portion of the wearer shown in phantom lines.

In accordance with the present invention, the "push-to-talk" switch 24 is constructed with a push button, or switch actuator part 30 that is adapted to be actuated by the wearer lifting his shoulder. The wearer lifts his shoulder from the normal position Sa shown in phantom lines in FIG. 1 to a raised position Sb at which it presses against the switch actuating part 30 to depress and operate the switch 24. As shown in FIG. 2, the switch 24 is a push-button type with a plunger 32 that is depressed to close the switch. A spring (not shown) of the switch pushes the plunger away from the switch body 24b so the switch is closed so long as the plunger is depressed. The switch is mounted on the earphone 12 so the depression direction 34 of switch actuation extends with a downward directional component.

Applicant prefers to orient the switch 24 so the direction of actuation 34 is angled in a downward-outward direction (relative to the vertical centerline 35 of the headset 10 and of the wearer). The actuation direction lies at an angle A from the vertical of about 30°. When the wearer lifts his shoulder from the downward position Sa to the lifted position Sb, his shoulder pivots largely about the bottom of the neck N. Applicant places the outer or lower end 36 of the switch actuator part 30 a distance B of at least an inch from the inner side 12i of the earphone to lie far from the neck N of the wearer. This is in addition to having the actuator part extend downwardly and outwardly. These mounting factors are used, without making the headset assembly especially large or cumbersome. Applicant finds that with the lower or outer end 36 of the actuator part lying about an inch below the rest of the earphone 12 and about one to two inches above the wearer's shoulder in the normal shoulder position Sa, the switch is easily activated. The lower end 36 of the switch activator also preferably lies a distance C of a plurality of inches (e.g., 2.75 inches) below the center 38 of the soft cushion 56 that surrounds the ear E, and that lies at about the level of the ear canal F of the wearer.

Figure 3:
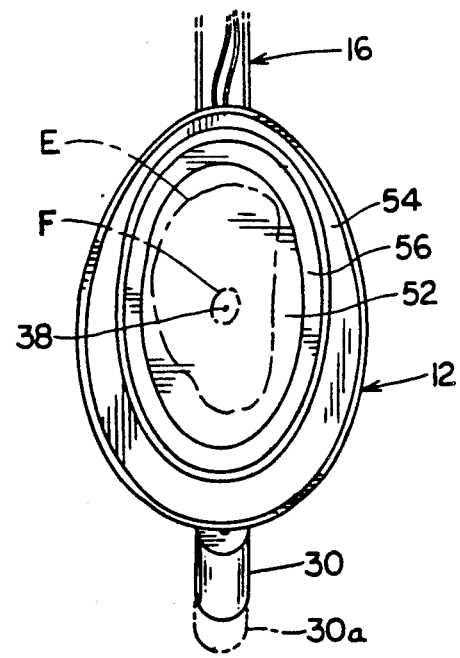
FIG. 3 is a view taken on the line 3—3 of FIG. 2.

When the person raises his shoulder, he actually moves his shoulder forwardly as well as pivoting it upwardly, and a location 40 on his shoulder moves forward and upwardly against the bottom of the switch actuator to depress the switch. The switch 24 is preferably at the left side of the wearer, as shown in the mirror image of FIG. 1, so right-handed persons can operate it with minimal effect on their right arm. Switch actuator parts 30 of different lengths can be mounted on the switch plunger 32 to adapt the assembly to different wearers, an elongated actuator part being shown at 30a in FIG. 3.

Applicant has constructed a headset assembly of the type illustrated, and found that the wearer can easily raise his shoulder (pivot it upwardly and forwardly) to operate the switch, without affecting his hand or his head and eyes. In the most common two-way radios where the switch must be depressed as long as the person is talking and transmitting, the wearer can comfortably keep his shoulder raised for an extended period such as a minute while talking, all without affecting use of his hands and head. This allows a person to operate machinery such as the steering wheel of a truck while keeping his eyes comfortably focused on the job (the road), while operating the headset assembly.

In order to indicate to the wearer when he has operated the switch, the switch is constructed so that it creates an easily heard "click" noise both when it is closed and when it is opened again. Accordingly, when the wearer lifts his shoulder to operate the switch, he can immediately tell when it has been closed and later opened, so he does not have to strain his muscles to press hard on the button to assure that the switch is closed.

In the particular headset assembly shown in FIG. 2, each earphone such as 12 includes a small speaker 50 lying behind a foam sheet 52, with both held in a plastic shell 54. A soft cushion 56 distributes force against the head of the wearer. Most of the mechanism of the switch 24 lies within the plastic shell. The shell has a projecting ball 60 that allows it to pivot on the end of the headband 16. A pair of wires 62 extend along the headband. Most headsets use two earphones, although some use only one.

Thus, the invention provides a headset or headset assembly of the type which includes a band that mounts about the head of a wearer and that holds a microphone substantially at the front of the wearer and at least one speaker at the ear of the wearer, and that includes a switch that is operated to allow transmission from the microphone. A switch actuator that operates the switch extends with a downward directional component from one side of the assembly to a location lying above a shoulder of the wearer, with the lower end of the actuator positioned so the wearer can depress it by lifting his shoulder. It is possible to use a switch that is operated by pushing an actuator to one side instead of depressing it, but such switches are generally more fragile and more expensive. With the inner side of a headphone lying closely around the wearer's ear, the bottom of the push-button actuator preferably lies at least an inch outward of the inner side of the earphone and a plurality of inches below the middle of the inner side of the earphone. In most cases, the switch is preferably located on the left side of the headset to facilitate operation by right-handed wearers. However, for truck drivers the switch is preferably on the right side where there is an earphone with a speaker; the left side of the headset assembly, which faces the adjacent left side truck window, is open (no speaker) to allow the driver to hear outside noises. The switch preferably creates a distinctive click sound when operated which can be heard even in a very noisy outside environment (over 100 db), to clearly indicate that fact to the wearer.

Although particular embodiments of the invention have been described and illustrated herein, it is recognized that modifications and variations may readily occur to those skilled in the art and consequently it is intended to cover such modifications and equivalents.

What is claimed is:

1. In a headset assembly with a microphone, at least one earphone, and a band constructed to mount about the head with said headset assembly having opposite sides at opposite sides of the wearer's head, with said microphone substantially at the front of the wearer and said earphone at one of said sides of the head to provide sound to the ear thereat, and wherein the headset assembly is switched from a receive mode to a transmit mode by manual operation of a switch, and wherein the headset assembly is usually worn by an active wearer who requires considerable freedom of movement of his arms and head, the improvement wherein:

said headset assembly includes a switch actuator extending largely downwardly from a first of said sides of said headset assembly and below any other adjacent part of the headset to a location lying above a first shoulder of the wearer and said switch actuator having a lower actuator end thereat, said actuator lower end being placed a distance above the wearer's shoulder so that the wearer has to lift his shoulder to contact the lower actuator part to deflect it and operate said switch.

2. The improvement described in claim 1 wherein:

said switch is a push-button type with a push button having an outer end and which is operated by depression of the push button outer end along a depression direction, said headset assembly having a vertical centerline and said switch is oriented so said push button outer end depression direction extends at an angle on the order of thirty degrees from said vertical centerline.

3. The improvement described in claim 2 wherein:

said switch is oriented so said push button outer end depression direction extends about 30° from said vertical centerline in a direction that is both upward and toward said vertical centerline.

4. The improvement described in claim 1 including:

a second actuator part of a different length than said first named actuator part and which can replace said first part, whereby to enable comfortable actuation by people with different neck lengths.

5. The improvement described in claim 1 wherein:

said headset assembly has left and right sides which lie respectively on the left and right sides of the wearer when said microphone lies in front of the wearer; and said switch actuator extends from said left side of said headset assembly.

6. The improvement described in claim 1 wherein:

said switch creates a "click" that is easily heard by the wearer, when the switch is operated.

7. The improvement described in claim 1 wherein:

most of said headset remains stationary when said actuator is deflected, and said actuator extends at least about one inch below any adjacent location of said mount of said headset which remains stationary.

8. A method for switching a headset assembly that includes a microphone, at least one earphone, and a band that mounts about the head of a wearer to hold opposite sides of the headset assembly at opposite parts of the wearer's head, wherein the headset assembly has a switch with a switch actuator lying at one of said sides that can be manually operated to switch between receive and transmit modes, comprising:

raising one of the shoulders of the wearer until said shoulder touches the switch actuator, and continuing to raise the shoulder until the switch is operated to switch between said receive and transmit modes.

* * * * *